(12) United States Patent  
Nagasawa

(10) Patent No.: US 10,543,759 B2  
(45) Date of Patent: Jan. 28, 2020

(54) VEHICLE SEAT APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 119 days.

(21) Appl. No.: 15/850,750

(22) Filed: Dec. 21, 2017

(65) Prior Publication Data

US 2018/0281624 A1 Oct. 4, 2018

(30) Foreign Application Priority Data

Mar. 30, 2017 (JP) .................. 2017-067306

(51) Int. Cl.
*B60N 2/00* (2006.01)
*B62D 15/00* (2006.01)
(Continued)

(52) U.S. Cl.
CPC .......... *B60N 2/0248* (2013.01); *B60N 2/767* (2018.02); *B62D 15/025* (2013.01); *G05D 1/0061* (2013.01); *G05D 2201/0213* (2013.01)

(58) Field of Classification Search
CPC ...... B60N 2/00; B60N 2/0248; B60N 2/0252; B60N 2/22; B60N 2/763; B60N 2/767;
(Continued)

(56) References Cited

U.S. PATENT DOCUMENTS 9,738,179 B2  8/2017 Ebina et al.
9,738,314 B2  8/2017 Oyama
(Continued)

FOREIGN PATENT DOCUMENTS

GB       2520842 A    6/2015
JP   2009-255778 A   11/2009
(Continued)

OTHER PUBLICATIONS

Japanese Office Action dated Sep. 25 2018 for Japanese Application No. 2017-067306 (4 pages in Japanese with English Translation).

*Primary Examiner* — Yonel Beaulieu
(74) *Attorney, Agent, or Firm* — Smith, Gambrell & Russell, LLP

(57) ABSTRACT

Provided is a vehicle seat apparatus for a vehicle capable of executing a manual steering mode in which a vehicle occupant steers the vehicle by using a steering device and an automatic steering mode in which steering of the vehicle is controlled without intervention of the occupant. The vehicle seat apparatus includes a seat back, an arm rest, and a controller. The seat back is configured to support a back of the occupant. The arm rest is configured to support an arm of the occupant. The controller is configured to moves at least one of the seat hack and the arm rest. During a transition period of the vehicle from the automatic steering mode to the manual steering mode, the controller performs control to move the seat back in a direction to raise the seat back and performs control to move at least a portion of the arm rest forward.

11 Claims, 3 Drawing Sheets

(51) Int. Cl.
  *G05D 1/00* (2006.01)
  *B60N 2/02* (2006.01)
  *B62D 15/02* (2006.01)
  *B60N 2/75* (2018.01)

(58) Field of Classification Search
  CPC .... B60N 2/75; G05D 1/00; G05D 2201/0213; B62D 15/00; B62D 15/025; A47C 1/00; A47C 1/03; A47C 1/031
  See application file for complete search history.

(56) References Cited

U.S. PATENT DOCUMENTS

| | | | | |
|---|---|---|---|---|
| 2009/0088930 | A1* | 4/2009 | Ohtsubo | B60N 2/0252 701/49 |
| 2012/0098317 | A1* | 4/2012 | Kim | B60N 2/757 297/411.29 |
| 2013/0218420 | A1* | 8/2013 | Jendritza | B60N 2/002 701/49 |
| 2013/0275006 | A1* | 10/2013 | Ystueta | B60N 2/0244 701/49 |
| 2014/0265479 | A1* | 9/2014 | Bennett | B60N 2/919 297/217.4 |
| 2015/0224877 | A1* | 8/2015 | Bendewald | B60K 37/06 701/49 |
| 2016/0264021 | A1* | 9/2016 | Gillett | B60K 1/04 |
| 2016/0280097 | A1* | 9/2016 | Hotary | B60N 2/0244 |
| 2016/0318442 | A1* | 11/2016 | James | B60Q 9/00 |
| 2016/0332586 | A1* | 11/2016 | Hong | G06F 16/2455 |
| 2018/0022248 | A1* | 1/2018 | Ketels | B60N 2/753 297/411.37 |
| 2018/0244175 | A1* | 8/2018 | Tan | B60N 2/0248 |

FOREIGN PATENT DOCUMENTS

| | | |
|---|---|---|
| JP | 2016-181015 A | 10/2016 |
| JP | 2017-109616 A | 6/2017 |
| JP | 2017-226343 A | 12/2017 |
| WO | 2015/011866 A1 | 1/2015 |

\* cited by examiner

US 10,543,759 B2

VEHICLE SEAT APPARATUS

CROSS-REFERENCE TO RELATED APPLICATIONS

The present application claims priority from Japanese Patent Application No. 2017-067306 filed on Mar. 30, 2017, the entire contents of which are hereby incorporated by reference.

BACKGROUND

1. Technical Field

The present invention relates to vehicle seat apparatuses, and particularly, to a vehicle seat apparatus used in a vehicle capable of executing a manual steering mode in which a vehicle occupant steers the vehicle by using a steering device and an automatic steering mode in which the steering of the vehicle is controlled without the intervention of the vehicle occupant.

2. Related Art

In recent years, vehicles that allow automated driving without the intervention of vehicle occupants are drawing attention. In an automated driving vehicle, it is important to control the acceleration and deceleration of the vehicle, perform control to follow a vehicle running ahead, and so on. In addition, control of steering not intervened by the vehicle occupant, that is, so-called automatic steering, including control for avoiding obstacles and control for following the lane, also occupies a large percentage. An example of such a vehicle that executes automatic steering is described in Japanese Unexamined Patent Application Publication No. 2016-181015. In this automatic steering vehicle, vehicle travel-route information is acquired from a so-called global positioning system (GPS) and map information, a target travel route is set from this travel-route information, and, steering control is performed so as to reduce a difference between an estimated travel route and the target travel route of the vehicle. Specifically, for instance, the steering control is performed so as to reduce a difference between the curvature of the estimated travel route and the curvature of the target travel route.

When focusing on the vehicle occupant in such an automatic steering control mode, since the vehicle occupant does not have to operate the steering device, it is assumed that the vehicle occupant may relax by reclining the seat back of the seat apparatus. Since it is unnatural to have the arm rest, which supports the arm, in a raised position in the state where the seat back is reclined, it is conceivable that the arm rest is also lowered when the seat back is reclined. During a transition period from the relaxing state in such an automatic steering control mode to a manual steering mode, it is necessary to recover to a state where the vehicle occupant can easily operate the steering device. In this case, simply raising the seat back that supports the occupant's back would still keep the occupant's hand in the lowered position, making it difficult to transition to the state where the vehicle occupant can easily operate the steering device. Moreover, simply raising the seat back and raising the arm rest would still keep the occupant's hand away from the steering device, making it difficult to transition to the state where the vehicle occupant can easily operate the steering device.

SUMMARY OF THE INVENTION

It is desirable to provide a vehicle seat apparatus that can achieve a state where a vehicle occupant can easily operate a steering device during a transition period from an automatic steering mode to a manual steering mode of a vehicle capable of executing the automatic steering mode.

An aspect of the present invention provides a vehicle seat apparatus for a vehicle capable of executing a manual steering mode in which a vehicle occupant steers the vehicle by using a steering device and an automatic steering mode in which steering of the vehicle is controlled without intervention of the vehicle occupant. The vehicle seat apparatus includes a seat back, an arm rest, and a controller. The seat back is configured to support a back of the vehicle occupant. The arm rest is configured to support an arm of the vehicle occupant. The controller is configured to move at least one of the seat back and the arm rest. During a transition period of the vehicle from the automatic steering mode to the manual steering mode, the controller performs control to move the seat back in a direction so as to raise the seat back and performs control to move at least a portion of the arm rest forward.

DETAILED DESCRIPTION

Figure 1:
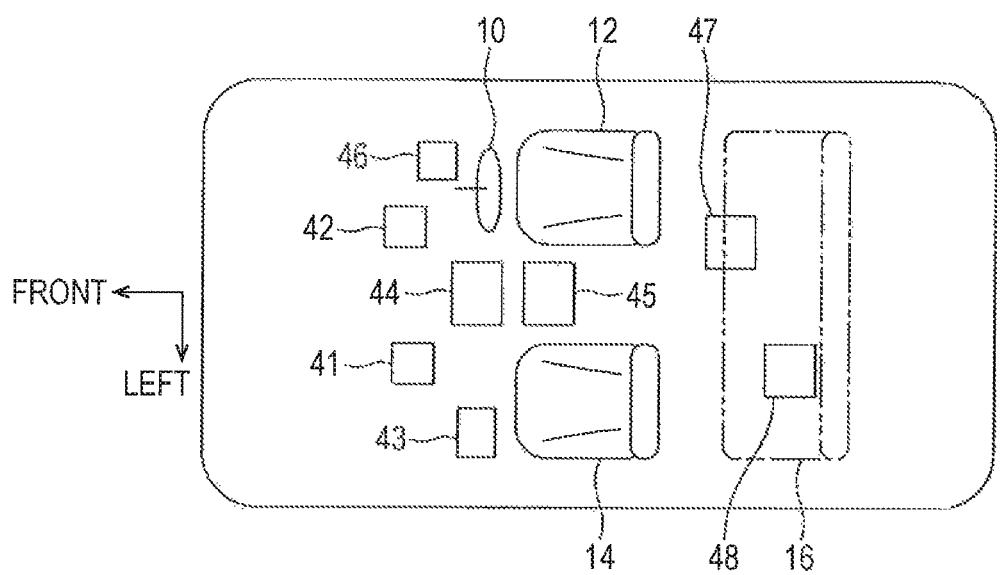
FIG. 1 is a plan view schematically illustrating a vehicle to which a vehicle seat apparatus according to an example of the present invention is applied.

A vehicle seat apparatus according to an example of the present invention will be described below in detail with reference to the drawings. FIG. 1 is a plan view schematically illustrating a vehicle to which the vehicle seat apparatus according to this example is applied. This vehicle is, for instance, a station wagon vehicle that can be manually steered by allowing a driver (vehicle occupant) to operate a steering wheel (steering device) 10 and that can also be automatically steered without the intervention of the driver. As already known, the steering device includes not only the steering wheel 10 but also a known steering system. In this example, for instance, an electric power steering device is included for automatic steering. Seats on which vehicle occupants sit include a driver seat 12, a front passenger seat 14, and a series of rear passenger seats 16.

During automatic steering, so-called automated driving not intervened by the driving by the driver is executed. Thus, the vehicle according to this example includes an engine control unit 41 that controls the operational state of an engine serving as a drive source, a transmission control unit 42 that controls the operational state of a transmission for efficiently transmitting a driving force of the engine, a brake control unit 43 that controls the operational state of a braking device provided for, for instance, each wheel, a navigation system 44 that detects the travel position of the vehicle and that acquires information about the travel route of the vehicle and the surrounding area thereof from preliminarily-stored map information, a periphery recognition device 45 that acquires information about the conditions surrounding the vehicle, particularly, information about an obstacle ahead of the vehicle, a steering control unit 46 that controls the operational state of the steering device based on the information about the travel route of the vehicle and the information about the obstacle ahead of the vehicle, a seat control unit 47 that controls the state of the occupant seats, particularly, the driver seat 12, and an automated-driving control unit 48 that performs automated driving, including automatic steering, by performing integrated control together with these control units.

Each of these control units 41 to 48 is equipped with an arithmetic processor, such as a microcomputer, and has an advanced arithmetic processing function. Therefore, each of these control units 41 to 48 is similar to a computer system in having an input-output unit and a storage unit in addition to the arithmetic processor. Furthermore, similar to vehicles in recent years, each control unit performs intercommunication, cooperative control, and exchanging and sharing of information with other controls units equipped in the vehicle. Each of the control units 41 to 48 can control the operational state of an actuator to be controlled by using an electric signal.

Figure 2:
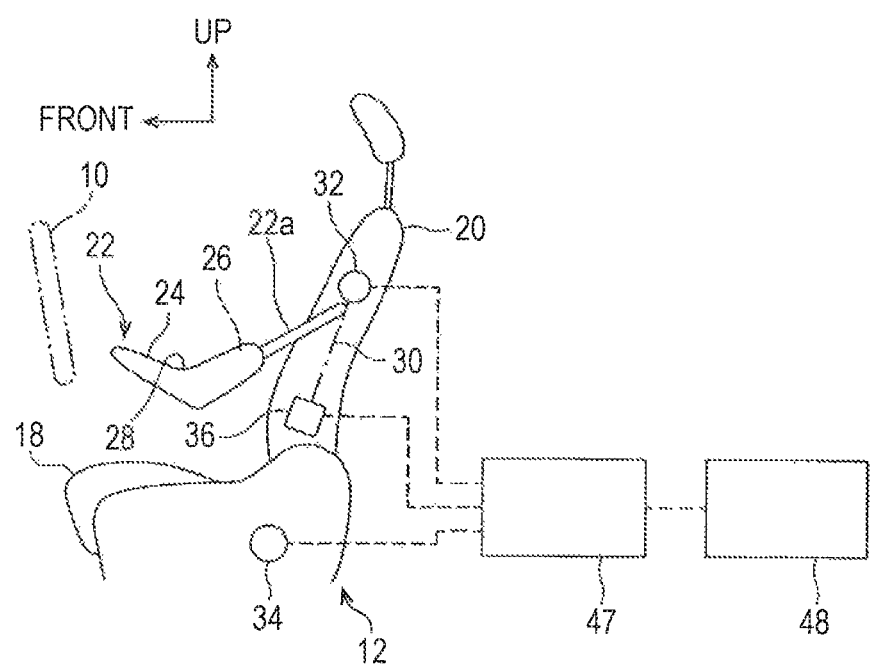
FIG. 2 is a system configuration diagram of the vehicle seat apparatus in FIG. 1.

FIG. 2 is a system configuration diagram of the vehicle seat apparatus according to this example and specifically illustrates the driver seat 12. The driver seat 12 itself is similar to an existing driver seat in having at least a seat cushion 18 on which the driver sits, a seat back 20 that supports the driver's back, and an arm rest 22 that supports the driver's arm. The seat cushion 18 and the seat back 20 are the same as or substantially the same as those of an existing driver seat. The arm rest 22 according to this example is slightly different from that of an existing driver seat. This arm rest 22 includes a forearm supporter 24 that supports the driver's forearm, an upper-arm supporter 26 that supports the driver's upper arm, and an elbow rest 28 provided between the two supporters. The forearm supporter 24 has a high front side in the vehicle front-rear direction (referred to as "front side" hereinafter) and a low rear side in the vehicle front-rear direction (referred to as "rear side" hereinafter). The upper-arm supporter 26 has a high rear side and a low front side. The elbow rest 28 provided between the two supporters is a so-called depression that accommodates and maintains the driver's elbow placed therein.

With regard to the arm rest 22 according to this example, an arm-rest support arm 22a protrudes in the rear-upper direction in FIG. 2 from the rear end of the upper-arm supporter 26, and the protruding end of the arm-rest support arm 22a is bent toward the seat back 20 and is inserted into a side surface of the seat back 20. This inserted portion of the protruding end of the arm-rest support arm 22a is coupled to a linear motion device 30 disposed within the seat back 20, and the linear motion device 30 is coupled to an arm-rest movement actuator 36, such as an electric motor. The linear motion device 30 linearly moves the inserted portion of the protruding end of the arm-rest support arm 22a in the erected direction of the seat back 20, that is, substantially in the vertical direction, so as to move the arm rest 22 in the vehicle front-rear direction. The inserted portion of the protruding end of the arm-rest support arm 22a is coupled to an arm-rest rotation actuator 32, such as an electric motor, similarly disposed within the seat back 20, The arm-rest rotation actuator 32 rotates, for instance, the front end of the arm rest 22, that is, the forearm supporter 24, rearward from the state in FIG. 2 or back toward the front side. A seat-back tilt actuator 34, such as an electric motor, for reclining and raising the seat back 20 is disposed in the seat cushion 18.

For instance, when the seat-back tilt actuator 34 is rotated in a predetermined direction from the erected state of the seat back 20 in FIG. 2, the upper end of the seat back 20 rotates rearward, thus reclining the seat back 20.

If the position of the arm rest 22 is kept in the state in FIG. 2 relative to the seat back 20 while the seat back 20 is reclined in this manner, it would be awkward for the driver reclining on the seat back 20 because the driver's arm placed on (supported by) the arm rest 22 would extend upward. As will be described later, when the driver is reclining on the seat back 20, it is natural for the driver's arm to be positioned alongside the driver's body and for the driver's elbow to be positioned slightly behind the driver's body. Therefore, in this example, in the state where the seat back 20 is reclined rearward, the arm rest 22 is rotated (rearward) by the arm-rest rotation actuator 32 such that the front side of the arm rest 22, that is, the forearm supporter 24, is lowered, and the linear motion device 30 is driven by the arm-rest movement actuator 36 so that the entire arm rest 22 is moved rearward in the vehicle front-rear direction. Consequently, the driver's arm is set in a natural position since the arm is moved toward the body of the driver reclining on the seat back 20. In this case, the driver's elbow is moved in the rear-down direction from the erected position of the seat back 20 in FIG. 2 so as to be positioned slightly behind the body of the driver in the reclined position.

In order for the driver to return to the position where the driver can easily operate the steering wheel 10, the seat-back tilt actuator 34 is rotated in the opposite direction from that described above, so that the upper end of the seat back 20 rotates forward, thus raising the seat back 20. Concurrently, the arm rest 22 is rotated (forward) so as to raise the front side of the arm rest 22, that is, the forearm supporter 24, and the linear motion device 30 is driven by the arm-rest movement actuator 36 in the opposite direction from that described above, so that the entire arm rest 22 moves forward in the vehicle front-rear direction. Consequently, the upper body of the driver becomes erect on the seat cushion 18 and the arm is moved in the front-upper direction in a state where the elbow is accommodated and maintained in the elbow rest 28, whereby the driver's hand is disposed near the steering wheel 10.

Although the arm of the driver whose elbow is supported by the elbow rest 28 can be moved in the front-upper direction by simply rotating the arm rest 22 (forward) so as to raise the front side of the arm rest 22, that is, the forearm supporter 24, the driver's back when the seat back 20 is erected tends to move away from the seat back 20 due to, for instance, a lumbar support. Therefore, by rotating the arm rest 22 forward while moving the entire arm rest 22 forward, the center of rotation of which is located at the upper side of the side surface of the seat back 20, the arm rest 22 can be moved further forward, so that the elbow rest 28 of the arm rest 22, that is, the driver's elbow, is pushed and moved further forward, whereby the driver's hand can be disposed near the steering wheel 10. Accordingly, the elbow rest 28 of the arm rest 22, the linear motion device 30, the arm-rest movement actuator 36, and the arm-rest rotation actuator 32 constitute an elbow pushing mechanism according to an example of the present invention.

The control for raising the seat back 20 by using the seat-back tilt actuator 34 is also referred to as seat-back raise control, and the control for reclining the seat back 20 is also referred to as seat-back recline control.

Furthermore, the control for moving the driver's elbow position in the front-upper direction by using the arm-rest movement actuator 36 and the arm-rest rotation actuator 32 is also referred to as elbow-position upward-forward movement (arm-rest forward-rotation) control, and the control for moving the elbow position in the rear-lower direction is also referred to as elbow-position downward-rearward movement (arm-rest rearward-rotation) control. In the seat-back raise control, the seat back 20 is raised forward until reaching either one of a predetermined seat-back erected state and a seat-back erected state appropriately set by the driver. Likewise, in the seat-back recline control, the seat back 20 is reclined rearward until reaching either one of a predetermined seat-back reclined state and a seat-back reclined state appropriately set by the driver. In the elbow-position downward-rearward movement control, the elbow position is moved downward and rearward until reaching either one of a predetermined downward-rearward elbow position and a downward-rearward elbow position appropriately set by the driver. Likewise, in the elbow-position upward-forward movement control, the elbow position is moved upward and forward until reaching either one of a predetermined upward-forward elbow position and an upward-forward elbow position appropriately set by the driver.

Figure 3:
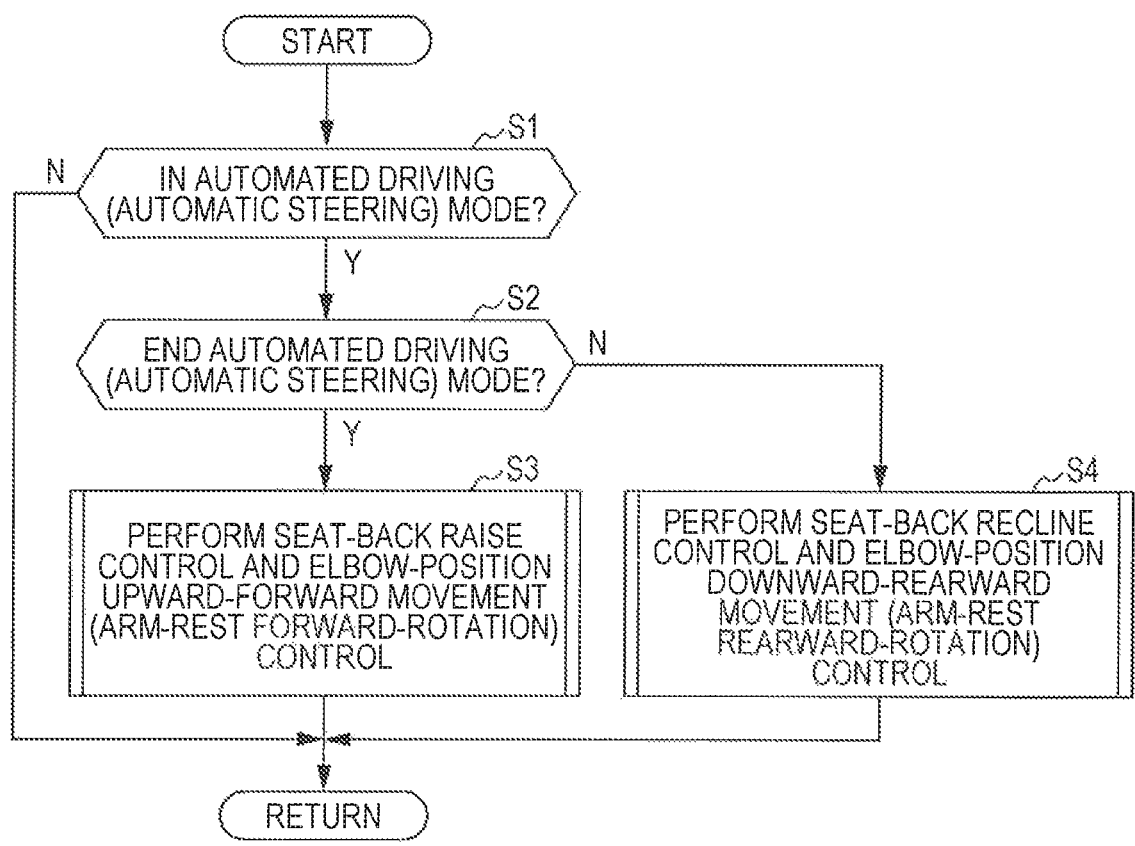
FIG. 3 is a flowchart of an arithmetic process executed by a seat control unit in FIGS. 1 and 2.

FIG. 3 is a flowchart of an arithmetic process executed by the seat control unit 47. This arithmetic process is executed in accordance with, for instance, timer interruption, at every predetermined sampling cycle. First, in step S1, is determined whether the vehicle is currently in an automated driving (automatic steering) mode in accordance with intercommunication with the automated-driving control unit 48. If the vehicle is in the automated driving (automatic steering) mode, the process proceeds to step S2. If not, the process returns to the start.

In step S2, it is determined whether to end the automated driving (automatic steering) mode from the current point in accordance with intercommunication with the automated-driving control unit 48. If the automated driving (automatic steering) mode is to be ended, the process proceeds to step S3. If not, the process proceeds to step S4.

In step S3, the above-described seat-back raise control is performed by the seat-back tilt actuator 34 and the above-described elbow-position upward-forward movement (arm-rest forward-rotation) control is performed by the arm-rest movement actuator 36 and the arm-rest rotation actuator 32 in accordance with individual arithmetic processing (not illustrated), and the process subsequently returns to the start.

On the other hand, in step S4, the above-described seat-back recline control is performed by the seat-back tilt actuator 34 and the above-described elbow-position downward-rearward movement (arm-rest rearward-rotation) control is performed by the arm-rest movement actuator 36 and the arm-rest rotation actuator 32 in accordance with individual arithmetic processing (not illustrated), and the process subsequently returns to the start.

Figure 4A:
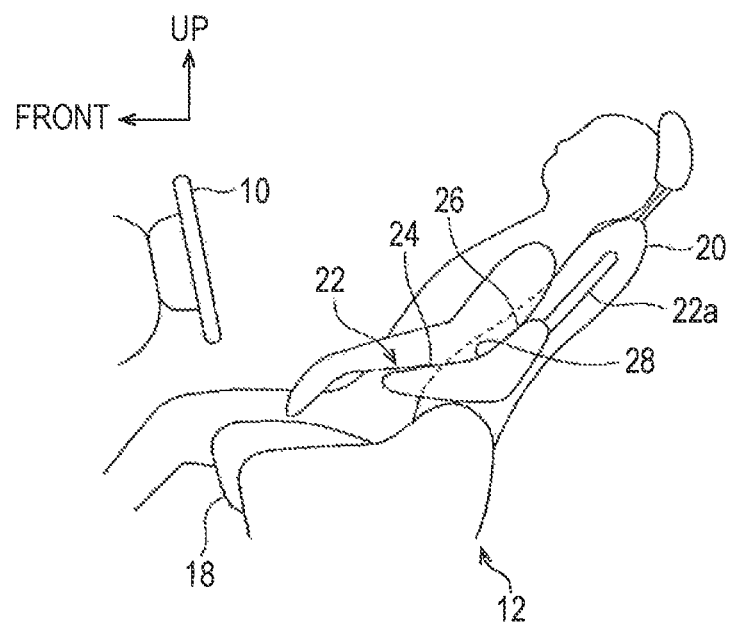
FIGS. 4A and 4B illustrate the operation based on the arithmetic process in FIG. 3.
Figure 4B:
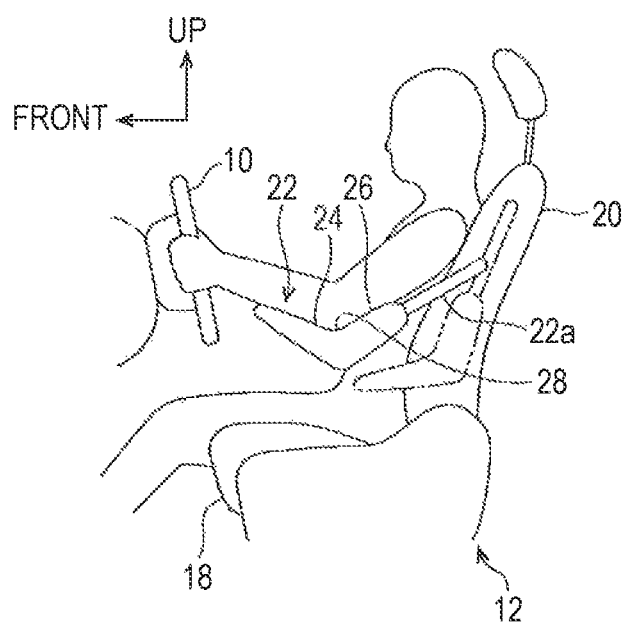

In this arithmetic processing, during the automated driving (automatic steering) mode, the driver can recline in a natural position on the seat back 20 by reclining the seat back 20 rearward and rotating the arm rest 22 rearward so that the driver's arm can be moved in the rear-lower direction, that is, toward the body, and the elbow can be positioned slightly behind the driver's body, as illustrated in FIG. 4A. Thus, the driver can relax during the automated driving (automatic steering) control. During a transition period from the automated driving (automatic steering) mode to the end of the automated driving mode (i.e. the start of the manual steering mode), the driver's arm is moved in the front-upper direction by raising the seat back 20 forward and rotating the arm rest 22 forward, and the driver's elbow position is pushed and shifted forward, whereby the driver's hand can be disposed near the steering wheel 10 and the upper body of the driver can be erected on the seat cushion 18, as illustrated in FIG. 4B. This draws the driver's attention prior to the manual steering mode, so that the driver can immediately hold and operate the steering wheel 10 after the transition to the manual steering mode.

For instance, if the seat back 20 is reclined and the arm rest 22 is lowered so as to allow the vehicle occupant to relax during the automated steering mode of the vehicle, the occupant's arm, particularly, the elbow, would be located slightly behind the occupant's body. Even if the seat back 20 is simply raised and the arm rest 22 is simply lifted from this state, the occupant's elbow is still located behind the occupant's body. Thus, the steering device is not in an easily operable state since the occupant's hand is located far from the steering device.

In this example, if the seat back 20 is in a reclined state during the transition, period from the automated steering mode to the manual steering mode of the vehicle, the seat back 20 is moved in the erecting direction and at least a portion of the arm rest 22 is moved forward. Therefore, in a state where the vehicle occupant has the arm placed on the arm rest 22, the occupant's hand is moved to a position near the steering wheel 10. During the transition period from the automatic steering mode to the manual steering mode, a state where the vehicle occupant can easily operate the steering wheel 10 can be created.

Furthermore, during the transition period from the automatic steering mode to the manual steering mode, control is performed by the elbow pushing mechanism such that at least a portion of the arm rest 22 is moved forward, so that the occupant's elbow position is pushed forward, whereby the occupant's hand can be reliably moved to a position near the steering wheel 10.

Furthermore, by causing the elbow pushing mechanism to move the elbow rest 28 provided in the arm rest 22 forward, the occupant's hand can be easily and reliably moved to a position near the steering wheel 10 in accordance with a simple configuration.

Moreover, the arm rest 22 lowered during the automatic steering mode of the vehicle is moved upward during the transition period to the manual steering mode of the vehicle, so that the occupant's hand can be naturally moved to a position near the steering wheel 10.

The elbow pushing mechanism that pushes the elbow position of the driver (vehicle occupant) forward may have a structure different from that in the above example. For instance, a movable protrusion that abuts on the elbow may be provided on an upper surface of a straight arm rest, and the movable protrusion may be pushed forward by an actuator, such as a linear motion device.

In the above example, a steering wheel is exemplified as the steering device to be operated by the driver (vehicle occupant). However, the vehicle steering device (steering input device) that allows automated driving is not necessarily limited to a steering wheel.

The present invention may include various examples not described above. Therefore, the technical scope of the present invention is defined only based on the specific matters described in the scope of the claims considered to be adequate from the above description.

The invention claimed is:

1. A vehicle seat apparatus for a vehicle capable of executing a manual steering mode in which a vehicle occupant steers the vehicle by using a steering device and an automatic steering mode in which steering of the vehicle is controlled without intervention of the vehicle occupant, the vehicle seat apparatus comprising:

a seat back configured to support a back of the vehicle occupant;

an arm rest configured to support an arm of the vehicle occupant; and a controller configured to move the seat back and the arm rest; and an elbow pushing mechanism configured to push an elbow position of the vehicle occupant forward by moving at least a portion of the arm rest forward, wherein, during a transition period of the vehicle from the automatic steering mode to the manual steering mode, the controller performs control to move the seat back in a direction so as to raise the seat back and performs control to move the at least a portion of the arm rest forward, and wherein the controller performs control to move the at least a portion of the arm rest forward by using the elbow pushing mechanism during the transition period from the automatic steering mode to the manual steering mode.

2. The vehicle seat apparatus according to claim 1, wherein the arm rest comprises an elbow rest on which an elbow of the vehicle occupant is placed, and wherein the elbow pushing mechanism is configured to move the elbow rest forward as the at least a portion of the arm rest.

3. A vehicle seat apparatus for a vehicle capable of executing a manual steering mode in which a vehicle occupant steers the vehicle by using a steering device and an automatic steering mode in which steering of the vehicle is controlled without intervention of the vehicle occupant, the vehicle seat apparatus comprising:

a seat back configured to support a back of the vehicle occupant;

an arm rest configured to support an arm of the vehicle occupant; and a controller configured to move the seat back and the arm rest, wherein, during a transition period of the vehicle from the automatic steering mode to the manual steering mode, the controller performs control to move the seat back in a direction so as to raise the seat back and performs control to move at least a portion of the arm rest forward, and wherein the controller performs control to move the arm rest upward, relative to the seat back, during the transition period from the automatic steering mode to the manual steering mode.

4. The vehicle seat apparatus according to claim 3, wherein the controller performs control to both move the arm rest upward by rotation and forward by linear adjustment during the transition period from the automatic steering mode to the manual steering mode.

5. The vehicle seat apparatus according to claim 2, wherein the controller performs control to move the arm rest upward during the transition period from the automatic steering mode to the manual steering mode.

6. The vehicle seat apparatus according to claim 1, wherein the elbow pushing mechanism is configured to linearly move forward the arm rest relative to the seat back.

7. The vehicle seat apparatus accordingly to claim 6, wherein the elbow pushing mechanism includes an arm rest attachment received by a linear adjustment region of the seat back such that adjustment within the linear adjustment region moves the arm rest in a linear direction forward during the transition period.

8. The vehicle seat apparatus accordingly to claim 7, wherein the arm rest attachment is rotatively received by the seat back and rotation in one direction leads to the upward arm rest movement during the transition period.

9. The vehicle seat apparatus according to claim 3, the vehicle seat apparatus further comprising:

an arm-rest movement actuator disposed within the seat back and coupled to the arm rest, wherein the arm-rest movement actuator is configured to move the arm rest forward and backward in the vehicle front-rear direction; and an arm-rest rotation actuator disposed within the seat back and coupled to the arm rest, wherein the arm-rest rotation actuator is configured to move the arm rest upward and downward in the vehicle vertical direction, wherein the controller controls the arm-rest movement actuator to move the arm rest forward in the vehicle front-rear direction and controls the arm-rest rotation actuator to move the arm rest upward in the vehicle vertical direction during the transition period from the automatic steering mode to the manual steering mode.

10. The vehicle seat apparatus according to claim 9, wherein the arm rest has a connection portion that connects an end of the arm rest to a side of the seat back, wherein the arm-rest movement actuator is configured to move the arm rest forward in the vehicle front-rear direction by moving the connection portion along a vertical length of the seat back.

11. The vehicle seat apparatus according to claim 9, wherein the arm rest has a connection portion that connects an end of the arm rest to a side of the seat back, wherein the arm-rest rotation actuator is configured to move the arm rest upward in the vehicle vertical direction by rotating the arm rest on the connection portion.

* * * * *